United States Patent
Grenci et al.

(10) Patent No.: US 9,399,685 B2
(45) Date of Patent: Jul. 26, 2016

(54) RUBBER COMPOUND MICROWAVE CURING METHOD

(75) Inventors: Valeria Grenci, Rome (IT); Salvatore Cotugno, Rome (IT)

(73) Assignee: BRIDGESTONE CORPORATION, Tokyo (JP)

(*) Notice: Subject to any disclaimer, the term of this patent is extended or adjusted under 35 U.S.C. 154(b) by 330 days.

(21) Appl. No.: 14/125,757

(22) PCT Filed: Jun. 15, 2012

(86) PCT No.: PCT/IB2012/053039
§ 371 (c)(1),
(2), (4) Date: Feb. 5, 2014

(87) PCT Pub. No.: WO2012/172520
PCT Pub. Date: Dec. 20, 2012

(65) Prior Publication Data
US 2014/0206824 A1 Jul. 24, 2014

(30) Foreign Application Priority Data
Jun. 15, 2011 (IT) .............................. TO2011A0525

(51) Int. Cl.
| C08F 8/32 | (2006.01) |
| C08J 3/24 | (2006.01) |
| C08J 3/28 | (2006.01) |
| C08K 5/19 | (2006.01) |
| B29C 35/08 | (2006.01) |

(52) U.S. Cl.
CPC ... *C08F 8/32* (2013.01); *C08J 3/24* (2013.01); *C08J 3/28* (2013.01); *C08K 5/19* (2013.01); *B29C 2035/0855* (2013.01); *C08J 2321/00* (2013.01)

(58) Field of Classification Search
CPC ................ C08F 8/32; C08J 3/24; C08J 3/28; C08J 2321/00; C08K 5/19; B29C 2035/0855
USPC .......................................... 525/332.5, 359.1
See application file for complete search history.

(56) References Cited

U.S. PATENT DOCUMENTS 8,557,900 B2 * 10/2013 Cantonetti ................ B60C 1/00
524/236

FOREIGN PATENT DOCUMENTS

| JP | EP 2181861 A1 * | 5/2010 | ............... B60C 1/00 |
| WO | 2011/042799 A1 | 4/2011 | |
| WO | WO 2011/042799 * | 4/2011 | ............... C08K 5/19 |

OTHER PUBLICATIONS

Berta Vega Sanchez ("New Insights in Vulcanization Chemistry using Microwaves as Heating Source", Nov. 20, 2008, pp. 1-200, XP055016760).*
Berta Vega Sanchez, "New Insights in Vulcanization Chemistry using Microwaves as Heating Source", Doctoral Thesis, Nov. 20, 2008, pp. 1-200, XP055016760.
International Search Report for PCT/IB2012/053039 dated Aug. 17, 2012.
Communication dated Jun. 5, 2015 from the European Patent Office in counterpart European Application No. 12740679.1.

* cited by examiner

*Primary Examiner* — Ling Choi
*Assistant Examiner* — Chun-Cheng Wang
(74) *Attorney, Agent, or Firm* — Sughrue Mion, PLLC

(57) ABSTRACT

A method of curing a compound having a cross-linkable, unsaturated-chain polymer base and a curing system; the method employing microwaves as a form of energy to promote curing reactions; and the curing system including compounds of general formula (I) $([R_1R_2R_3NR_5(NR_4R_6R_7)_n]^{(n+1)+})y(n+1)X^{y-}$ (I) where: X is an atom or anionic group; $R_1$, $R_2$, $R_3$, which are the same or different, are each $C_mH_{2m+1}$, where m is 1 to 3, or $CH_2CHCH_2$ or $CHCHCH_3$; $R_4$, $R_6$, $R_7$, which are the same or different, are each $CH_2CHCH_2$ or $CHCHCH_3$; n is 0 or 1; y is 1 when n is 1; y is 1 or 2 when n is 0; $R_5$ is an aliphatic group $C_{15}$-$C_{22}$ when n is 0; is an aliphatic group $C_8$-$C_{16}$ when n is 1; when n is 0, at least one of $R_1$, $R_2$, $R_3$, $R_5$ has a double bond.

7 Claims, No Drawings

RUBBER COMPOUND MICROWAVE CURING METHOD

CROSS REFERENCE TO RELATED APPLICATIONS

This application is a National Stage of International Application No. PCT/IB2012/053039 filed Jun. 15, 2012, claiming priority based on Italian Patent Application No. TO2011A000525 filed Jun. 15, 2011, the contents of all of which are incorporated herein by reference in their entirety.

TECHNICAL FIELD

The present invention relates to a rubber compound microwave curing method.

More specifically, the method according to the present invention applies to rubber compounds for producing tyres, to which the following description refers purely by way of a non-limiting example.

BACKGROUND ART

As is known, in traditional rubber compound curing methods, curing reactions are produced by heating the rubber compound. In tyre manufacturing, for example, the green semifinished part is inserted inside a mold, in which the rubber compound is heated.

For some time, a need has been felt within the industry for curing methods employing a form of energy other than heat.

In one such method, curing reactions are produced using microwaves, which is a highly interesting alternative form of energy in terms of easy use and low energy content.

Microwave curing tests of rubber compounds comprising conventional curing systems, however, have proved unsatisfactory in terms of the physical characteristics of the cured rubber compounds.

DISCLOSURE OF INVENTION

It is an object of the present invention to provide a method of curing rubber compounds using microwave energy, with none of the drawbacks of the known art.

The Applicant has surprisingly discovered that successful microwave curing of rubber compounds can be assured using a particular class of compounds as curing accelerants.

One object of the present invention is a method of curing a rubber compound comprising at least one cross-linkable, unsaturated-chain polymer base and a curing system; said method being characterized by comprising the use of microwaves as a form of energy to promote curing reactions; and in that said curing system comprises compounds of general formula (I)

$$([R_1R_2R_3NR_5(NR_4R_6R_7)n]^{(n+1)+})y(n+1)X^{y-} \quad (I)$$

where:

X is an atom or anionic group;

$R_1$, $R_2$, $R_3$, which are the same or different, are each $C_mH_{2m+1}$, where m is 1 to 3, or $CH_2CHCH_2$ or $CHCHCH_3$;

$R_4$, $R_6$, $R_7$, which are the same or different, are each $CH_2CHCH_2$ or $CHCHCH_3$;

n is 0 or 1;

y is 1 when n is 1; y is 1 or 2 when n is 0;

$R_5$ is an aliphatic group $C_{15}$-$C_{22}$ when n is 0; is an aliphatic group $C_8$-$C_{16}$ when n is 1;

when n is 0, at least one of $R_1$, $R_2$, $R_3$, $R_5$ comprises a double bond.

The compounds of general formula (I) are preferably curing accelerants.

$R_1$, $R_2$, $R_3$ are preferably $CH_2CHCH_2$.

Preferably, n is 1, and $R_5$ is a saturated aliphatic group.

Alternatively, $R_5$ preferably comprises a double bond, and n is 0.

The compounds of general formula (I) are preferably in the group comprising:

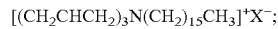

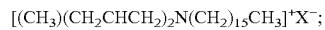

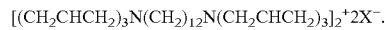

Preferably, $X^-$ is $I^-$ or $Br^-$.

Another object of the present invention is a cured-rubber product, characterized by being made using the method according to the present invention.

Another object of the present invention is a tyre, characterized by comprising at least one rubber part made using the method according to the present invention.

BEST MODE FOR CARRYING OUT THE INVENTION

The following examples are purely indicative, and in no way limiting, for a clearer understanding of the present invention.

Examples

In the following examples, five different compounds (a, b, c, d, e) of general formula (I) were used:

compound (a) of molecular formula $[(CH_3)_3N(CH_2)_8CHCH(CH_2)_7CH_3]^+I^-$;

compound (b) of molecular formula $[(CH_2CHCH_2)(CH_3)_2N(CH_2)_{15}CH_3]^+I^-$;

compound (c) of molecular formula $[(CH_3)(CH_2CHCH_2)_2N(CH_2)_{15}CH_3]^+I^-$;

compound (d) of molecular formula $[(CH_2CHCH_2)_3N(CH_2)_{15}CH_3]^+Br^-$; and compound (e) of molecular formula $[(CH_2CHCH_2)_3N(CH_2)_{12}N(CH_2CHCH_2)_3]^+2Br^-$.

Five rubber compounds (A-E) were produced, each comprising a respective compound (a)-(e).

For comparison purposes, another rubber compound F was produced comprising the curing system of the known art.

Table I shows the compositions in phr of the above rubber compounds.

TABLE I

|  | A | B | C | D | E | F |
|---|---|---|---|---|---|---|
| NR |  |  | 100 |  |  |  |
| N660 |  |  | 30 |  |  |  |
| ZnO |  |  | 2 |  |  |  |
| S |  |  | 2 |  |  |  |
| comp. (a) | 2 | — | — | — | — | — |
| comp. (b) | — | 2 | — | — | — | — |
| comp. (c) | — | — | 2 | — | — | — |
| comp. (d) | — | — | — | 2 | — | — |
| comp. (e) | — | — | — | — | 2 | — |
| TBBS | — | — | — | — | — | 2 |
| Stearic acid | — | — | — | — | — | 1 |

As shown in the Table I compositions, in each of rubber compounds A-E, a compound of general formula (I) was substituted for the TBBS (N-terbutylbenzothiazolesulphenamide) accelerant.

Also, only rubber compound F contains stearic acid.

Rubber compounds A-E were cured using microwave energy.

This was done using a Microwave System CEM laboratory oven, model MDS-2100, which has PID temperature control for testing at constant temperature.

More specifically, the main characteristics of the oven used are:

- 0-1000±50 watt power range with programmable 1% increments;
- fibre optic sensor temperature control (maximum operating temperature 185° C.). PID temperature control is performed by the internal processor on the oven.

The tests below were conducted using 100 W microwave power for 50 minutes.

To obtain a significant comparison, the control rubber compound F was cured using microwave energy as described above, as well as the conventional curing method by heating to 150° C. for 15 minutes.

The physical properties (TB, 100%, 300%, EB) of the cured rubber compounds were tested as per ASTM Standard D412C, and hardness (HD) as per ISO48.

Table II shows the physical properties expressed in MPa, and Shore A hardness.

TABLE II

|      | A    | B    | C    | D    | E    | $F_{MW}$ | $F_T$ |
|------|------|------|------|------|------|------|------|
| TB   | 12.1 | 12.5 | 12.8 | 13.5 | 28.5 | 11.3 | 29.0 |
| 100% | 1.02 | 1.05 | 1.03 | 1.07 | 1.12 | 0.80 | 1.21 |
| 300% | 3.98 | 4.02 | 4.23 | 4.32 | 5.80 | 1.30 | 6.59 |
| EB   | 563  | 542  | 538  | 523  | 512  | 434  | 603  |
| HD   | 38   | 39   | 40   | 40   | 43   | 30   | 45   |

The results in Table II clearly show how substituting the compounds of general formula (I) for the TBBS accelerant provides for more effectively microwave curing the rubber compound, and more specifically how microwave curing rubber compounds A-E provides for obtaining rubber products of acceptable physical properties, unlike those obtained by microwave curing control rubber compound F.

As will be obvious to anyone skilled in the art, the physical property results may be improved by adding appropriate ingredients.

Comparison with the Table II results relative to the heat-cured rubber compound F ($F_T$) also shows how microwave curing may be substituted for heat curing without completely compromising the physical properties of the end product, which, as stated, may be further improved by adding appropriate ingredients.

Curing rubber compounds using the method according to the present invention improves energy consumption, and enables rubber compounds to be cured in conjunction with already-cured rubber with no risk to the latter.

Unlike conventional curing methods, which may result in deterioration of the already-cured rubber compound.

One example of such a situation is rubber compounds used to repair parts of cured tyres. In which case, it is important that the repair rubber compound, once applied to the repair area, be cured without subjecting the cured rubber of the tyre to prolonged thermal stress.

In this connection, another important point to note is the ease with which microwave energy can be targeted, and which is a particularly important advantage when applying curing conditions to one rubber compound forming part of a more complex rubber product, such as a tyre.

The invention claimed is:

1. A method of curing a compound comprising a cross-linkable, unsaturated-chain polymer base and a curing system; said method being characterized by comprising a curing step wherein the compound is cured by using microwaves as a form of energy to promote curing reactions; and in that said curing system comprises compounds of general formula (I)

$$([R_1R_2R_3NR_5(NR_4R_6R_7)n]^{(n+1)+})y(n+1)X^{y-} \quad (I)$$

where:

X is an atom or anionic group;

$R_1$, $R_2$, $R_3$, which are the same or different, are each $C_mH_{2m+1}$, where m is 1 to 3, or $CH_2CHCH_2$ or $CHCHCH_3$;

$R_4$, $R_6$, $R_7$, which are the same or different, are each $CH_2CHCH_2$ or $CHCHCH_3$;

n is 0 or 1;

y is 1 when n is 1; y is 1 or 2 when n is 0;

$R_5$ is an aliphatic group $C_{15}$-$C_{22}$ when n is 0; is an aliphatic group $C_8$-$C_{16}$ when n is 1;

when n is 0, at least one of $R_1$, $R_2$, $R_3$, $R_5$ comprises a double bond.

2. A rubber compound curing method as claimed in claim 1, characterized in that said compounds of general formula (I) are curing accelerants.

3. A rubber compound curing method as claimed in claim 1, characterized in that $R_1$, $R_2$, $R_3$ are $CH_2CHCH_2$.

4. A rubber compound curing method as claimed in claim 3, characterized in that n is 1, and $R_5$ is a saturated aliphatic group.

5. A rubber compound curing method as claimed in claim 1, characterized in that $R_5$ comprises a double bond, and n is 0.

6. A rubber compound curing method as claimed in claim 1, characterized in that the compounds of general formula (I) are in the group comprising:

$[(CH_3)_3N(CH_2)_8CHCH(CH_2)_7CH_3]^+X^-$;

$[(CH_2CHCH_2)_3N(CH_2)_{15}CH_3]^+X^-$;

$[(CH_3)(CH_2CHCH_2)_2N(CH_2)_{15}CH_3]^+X^-$;

$[(CH_2CHCH_2)(CH_3)_2N(CH_2)_{15}CH_3]^+X^-$; and $[(CH_2CHCH_2)_3N(CH_2)_{12}N(CH_2CHCH_2)_3]_2^+2X^-$.

7. A rubber compound curing method as claimed in claim 1, characterized in that $X^-$ is $I^-$ or $Br^-$.

* * * * *